(12) United States Patent
Edwards et al.

(10) Patent No.: US 12,041,075 B2
(45) Date of Patent: Jul. 16, 2024

(54) DETECTING MALICIOUS ACTIVITY ASSOCIATED WITH RESETTING AUTHENTICATION INFORMATION

(71) Applicant: Capital One Services, LLC, McLean, VA (US)

(72) Inventors: Joshua Edwards, Philadelphia, PA (US); Michael Mossoba, Great Falls, VA (US); Abdelkader M'Hamed Benkreira, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 345 days.

(21) Appl. No.: 17/444,854

(22) Filed: Aug. 11, 2021

(65) Prior Publication Data

US 2023/0047190 A1    Feb. 16, 2023

(51) Int. Cl.
*H04L 9/40* (2022.01)
*H04L 51/212* (2022.01)
*G06N 20/00* (2019.01)

(52) U.S. Cl.
CPC ........ *H04L 63/1441* (2013.01); *H04L 51/212* (2022.05); *H04L 63/083* (2013.01); *H04L 63/1425* (2013.01); *G06N 20/00* (2019.01)

(58) Field of Classification Search
CPC . H04L 63/1441; H04L 51/212; H04L 63/083; H04L 63/1425; G06N 20/00
See application file for complete search history.

(56) References Cited

U.S. PATENT DOCUMENTS

| | | | |
|---|---|---|---|
| 2014/0380478 A1* | 12/2014 | Canning | H04L 63/1416 726/23 |
| 2020/0195671 A1* | 6/2020 | Engan | H04L 63/1425 |
| 2020/0204572 A1* | 6/2020 | Jeyakumar | G06F 21/566 |
| 2021/0319099 A1* | 10/2021 | Gaddam | H04L 63/1408 |

* cited by examiner

*Primary Examiner* — Cheng-Feng Huang
(74) *Attorney, Agent, or Firm* — Harrity & Harrity, LLP

(57) ABSTRACT

In some implementations, a device may monitor incoming messages to at least one message account of a user. The device may determine, based on monitoring the incoming messages, that one or more messages, of the incoming messages, are associated with resetting authentication information for one or more accounts of the user. The device may determine, based on determining that the one or more messages are associated with resetting authentication information, whether the one or more messages are indicative of abnormal authentication information resetting activity. The device may perform one or more actions based on determining that the one or more messages are indicative of abnormal authentication information resetting activity.

20 Claims, 8 Drawing Sheets

DETECTING MALICIOUS ACTIVITY ASSOCIATED WITH RESETTING AUTHENTICATION INFORMATION

BACKGROUND

A user having an account with a website, service, or device may perform a password reset to invalidate a current password for the account and to create a new password for the account. The user may request to perform a password reset for the account, and in response, the user may receive an email that includes a link for resetting the password.

SUMMARY

Some implementations described herein relate to a system for mitigating malicious activity associated with resetting passwords. The system may include one or more memories and one or more processors communicatively coupled to the one or more memories. The one or more processors may be configured to monitor incoming email messages to an email account of a user. The one or more processors may be configured to determine, based on monitoring the incoming email messages, that one or more email messages, of the incoming email messages, are associated with resetting passwords for one or more accounts of the user. The one or more processors may be configured to determine, based on determining that the one or more email messages are associated with resetting passwords, whether the one or more email messages are indicative of abnormal password resetting activity. The one or more processors may be configured to cause deletion of the one or more email messages based on determining that the one or more email messages are indicative of abnormal password resetting activity.

Some implementations described herein relate to a method of mitigating malicious activity associated with resetting authentication information. The method may include monitoring incoming messages to at least one message account of a user. The method may include determining, based on monitoring the incoming messages, that one or more messages, of the incoming messages, are associated with resetting authentication information for one or more accounts of the user. The method may include determining, based on determining that the one or more messages are associated with resetting authentication information, whether the one or more messages are indicative of abnormal authentication information resetting activity. The method may include performing one or more actions based on determining that the one or more messages are indicative of abnormal authentication information resetting activity.

Some implementations described herein relate to a non-transitory computer-readable medium that stores a set of instructions for mitigating malicious activity associated with resetting authentication information for a device. The set of instructions, when executed by one or more processors of the device, may cause the device to monitor incoming messages to a message account of a user. The set of instructions, when executed by one or more processors of the device, may cause the device to determine, based on monitoring the incoming messages, whether one or more messages, of the incoming messages, are indicative of abnormal authentication information resetting activity. The set of instructions, when executed by one or more processors of the device, may cause the device to perform one or more actions based on determining that the one or more messages are indicative of abnormal authentication information resetting activity.

DETAILED DESCRIPTION

Figure 1A:
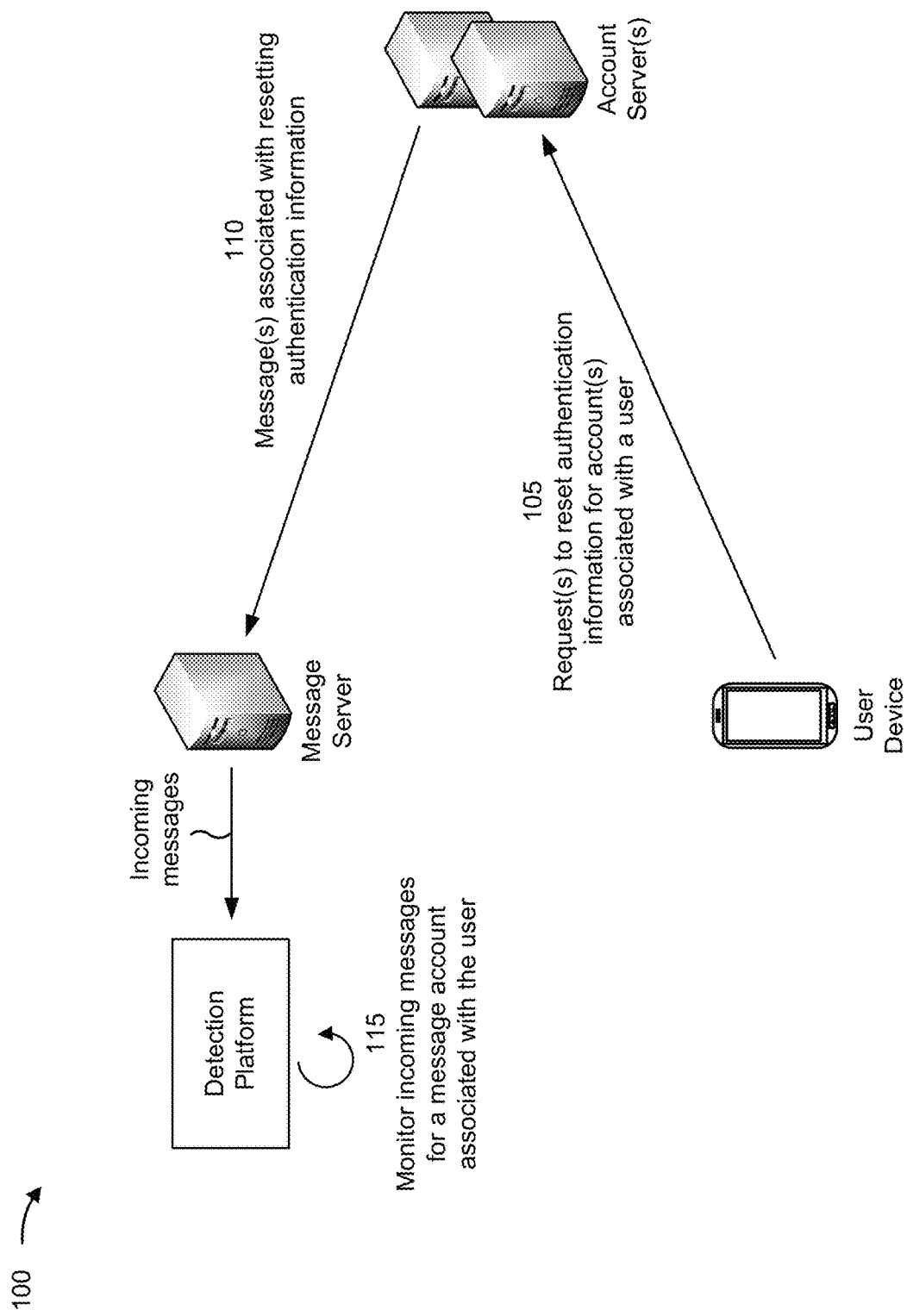
FIGS. 1A-1D are diagrams of an example implementation relating to detecting malicious activity associated with resetting authentication information.

The following detailed description of example implementations refers to the accompanying drawings. The same reference numbers in different drawings may identify the same or similar elements.

A user that has forgotten a password used for accessing an account may request to perform a password reset for the account. For example, the user may request to perform the password reset via a website associated with the account. Typically, in response to the request, the website sends an email to an email account of the user that is registered with the website. The email may contain a link to a webpage where the user can create and submit a new password for the account.

However, vulnerabilities of the aforementioned procedure can be exploited by a malicious actor to gain access to the account of the user. For example, if the malicious actor is able to access the user's email account, then the malicious actor can request and obtain a password reset email for the user's account with the website. Continuing with the example, the malicious actor can perform a password reset for the account using a link provided in the password reset email, and thereby take control of the user's account. As a result, excessive computing resources may be consumed in connection with the email traffic, the unauthorized account access, investigating the unauthorized account access, remediating the unauthorized account access, or the like. Moreover, because the password reset is performed by the malicious actor using an email that is sent to a verified email address for the user, detection of such behavior using automated techniques is difficult.

A solution to the above technical problems is described herein for detection of unauthorized use of an email account, or another type of account, for malicious password resetting purposes. In some implementations, incoming messages (e.g., to the email account) may be monitored to determine whether one or more of the messages are associated with resetting passwords. Furthermore, characteristics of the one or more password resetting messages may be used to determine whether the one or more password resetting messages are indicative of abnormal password resetting activity. For example, the characteristics of the one or more password resetting messages may be processed using a machine learning model to identify abnormal password resetting activity. In some implementations, various actions may be performed in response to determining that the password resetting activity is abnormal, such as actions associated with automatically deleting password reset messages, transmitting a notification, and/or preventing the unauthorized use of the email account, among other examples. In this way, unauthorized password resetting and subsequent unauthorized account access may be prevented or suppressed, thereby conserving computing resources associated with the unauthorized account access, investigating the unauthorized account access, remediating the unauthorized account access, or the like. Moreover, the techniques described herein improve computer security, electronic account security, website security, or the like.

FIGS. 1A-1D are diagrams of an example 100 associated with detecting malicious activity associated with resetting passwords. As shown in FIGS. 1A-1D, example 100 includes a user device, one or more account servers (each of which may include one or more server devices), a message server (which may include one or more server devices), and a detection platform (which may include one or more server devices). These devices are described in more detail in connection with FIGS. 2 and 3.

As described herein, a user may be associated with one or more accounts. For example, an account of the user may be with a financial institution, a retailer, or the like. Moreover, an account of the user may be accessed via a website associated with the account. For example, an account of the user with a financial institution may be accessed via a website of the financial institution. In addition, the user may have a message account (e.g., an email account, a text message account, or the like) that is registered (e.g., using an identifier, such as an email address, a phone number, or the like) in connection with each of the one or more accounts. For example, registration of the message account with an account may indicate that communications for the account that are intended for the user may be sent to the user's message account.

In some implementations, the detection platform may receive, from a user device associated with the user, an indication to perform monitoring of the message account for abnormal authentication information resetting activity. The indication also may indicate a sensitivity level that is to be used by the detection platform for determining abnormal authentication information resetting activity.

As shown in FIG. 1A, and by reference number 105, one or more account servers may receive requests to reset the authentication information for one or more accounts associated with the user. As used herein, "authentication information" may refer to a username, a password, a personal identification number (PIN), biometric information, a security question, and/or other information used for user authentication.

As described above, the requests may be triggered via respective websites (e.g., through a "forgot password" form, or the like) associated with the account server(s). In some examples, the requests may be initiated by the user, and therefore may be considered to be authorized. However, in some other examples, the requests may be initiated by a malicious actor, and therefore may be considered to be unauthorized. For example, as described above, the malicious actor may have unauthorized access to the message account (e.g., the email account, the text message account, or the like) of the user.

As shown by reference number 110, the one or more account servers may transmit, and the message server may receive, respective messages associated with resetting authentication information for the one or more accounts associated with the user. For example, messages transmitted by the one or more account servers that are addressed to (e.g., using an email address, a phone number, or the like) the user's message account may be received at the message server. The messages may be associated with resetting authentication information (e.g., a password) for the one or more accounts. For example, the message server may receive a first message (e.g., from a first account server) associated with resetting authentication information for a first account of the user and a second message (e.g., from a second account server) associated with resetting authentication information for a second account of the user. A message associated with resetting authentication information may include a link for resetting the authentication information, temporary authentication information (e.g., a temporary password), instructions for resetting the authentication information, or the like.

As shown by reference number 115, the detection platform may monitor incoming messages to the message account (e.g., an email account, a text message account, or the like) associated with the user. Monitoring of the incoming messages may include obtaining the messages and/or analyzing the messages (e.g., scanning text of the messages). For example, analyzing a message may include processing metadata of the message (e.g., an email header, sender information, recipient information, transmission information, or the like), processing a subject field of the message, and/or processing a body field (e.g., a message field) of the message, among other examples. In some implementations, the incoming messages may include email messages, text messages, and/or electronic chat messages, among other examples.

Figure 1B:
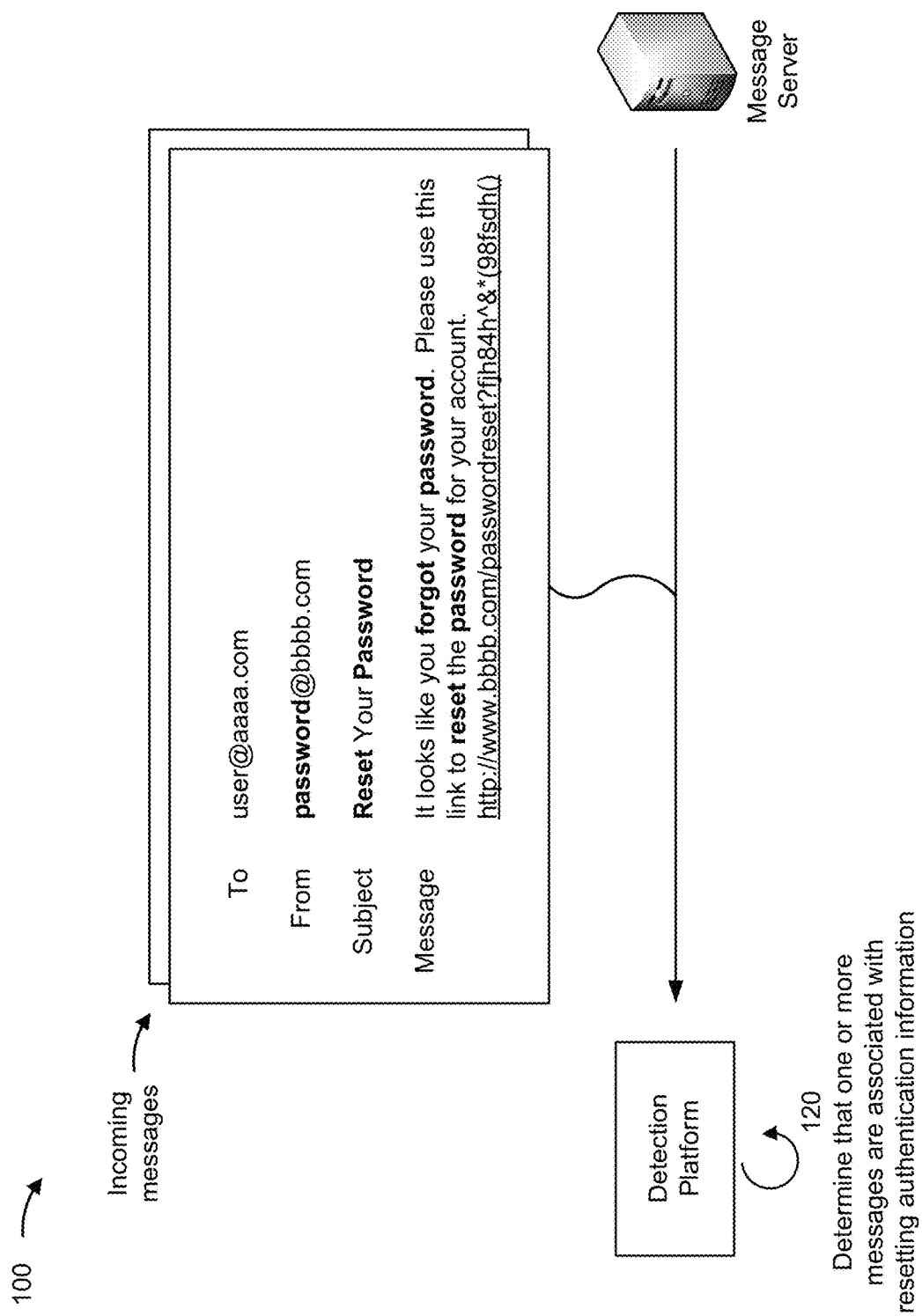

As shown in FIG. 1B, and by reference number 120, the detection platform may determine that one or more of the incoming messages (e.g., email messages, text messages, or the like) are associated with resetting authentication information (e.g., resetting passwords) for one or more accounts associated with the user. That is, the detection platform may determine that one or more messages are associated with resetting authentication information based on monitoring the incoming messages. In some implementations, the detection platform may determine that the one or more messages are associated with resetting authentication information based on contents (e.g., subject contents, message contents, or the like) of the one or more messages and/or senders (e.g., sending email addresses, sending phone numbers, or the like) of the one or more messages.

To determine that the one or more messages are associated with resetting authentication information, the detection platform may analyze and/or process the incoming messages, as described above. For example, the detection platform may process the incoming messages to identify whether one or more messages include one or more particular keywords, such as "password," "reset," "forgot," or the like. Thus, the detection platform may determine that the one or more messages are associated with resetting authentication information based on identifying that the one or more messages include the one or more keywords (e.g., include at least one of the keywords, include multiple of the keywords, include a threshold quantity of the keywords, or include a threshold quantity of occurrences of the keywords). As another example, the detection platform may perform natural language processing of the incoming messages to identify intent classifications for the messages (e.g., a "password reset" classification, a "marketing" classification, a "newsletter" classification, a "correspondence" classification, or the like). Thus, the detection platform may determine that one or more messages are associated with resetting authentication information based on the intent classifications (e.g., the one or more messages are associated with a "password reset" classification).

Figure 1C:
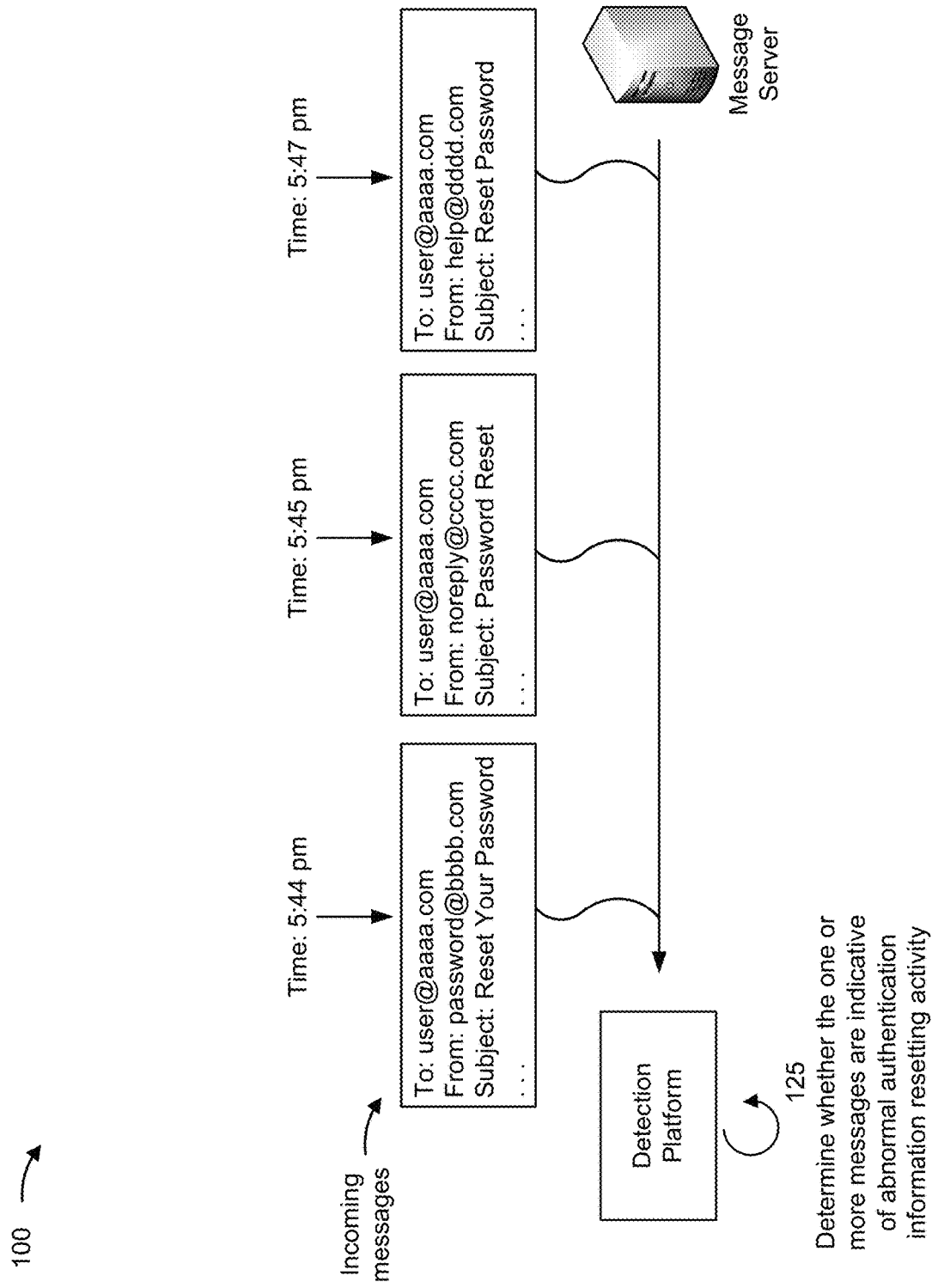

As shown in FIG. 1C, and by reference number 125, the detection platform may determine whether the one or more messages, associated with resetting authentication information, are indicative of abnormal authentication information resetting activity. That is, the detection platform may determine whether the one or more messages are indicative of abnormal authentication information resetting activity based on determining that the one or more messages are associated with resetting authentication information (e.g., resetting passwords). Abnormal authentication information resetting activity may indicate that the message account of the user has been accessed by a malicious actor.

In some implementations, the detection platform may determine that the one or more messages are indicative of abnormal authentication information resetting activity based on the one or more messages arriving at the message account within a threshold time period, based on a quantity of the one or more messages satisfying a threshold value, and/or based on the one or more messages being associated with resetting authentication information for multiple different accounts of the user. For example, if a threshold quantity of authentication information reset emails (e.g., three) arrive within a threshold time period (e.g., two minutes), and the authentication information reset emails are for different accounts of the user (e.g., a bank account, a cloud storage account, and a retailer account), then the detection platform may determine that the authentication information reset emails are indicative of abnormal authentication information resetting activity.

In some implementations, the detection platform may determine that the one or more messages are indicative of abnormal authentication information resetting activity using a model (e.g., a machine learning model) trained, or otherwise configured, to output an indication (e.g., "true" or "false") of abnormal authentication information resetting activity based on an input of information relating to the one or more messages (e.g., contents and/or metadata of the one or more messages). For example, the model may be trained to identify whether a frequency of authentication information resetting activity is normal or abnormal. In some implementations, the model may determine whether messages are indicative of abnormal authentication information resetting activity based on a feature set that includes a quantity of the messages, times of arrival of the messages, an average time gap between arrivals of the messages, senders of the messages, and/or accounts associated with the messages, among other examples. In some implementations, the model may be trained to determine whether messages are indicative of abnormal authentication information resetting activity based on historical data relating to the user or to a plurality of users. For example, the historical data may relate to incoming messages to the message account of the user and/or incoming messages to message accounts of the plurality of users.

Based on determining that the one or more messages are indicative of abnormal authentication information resetting activity, the detection platform may determine that the message account of the user has been accessed by a malicious actor. Accordingly, based on determining that the one or more messages are indicative of abnormal authentication information resetting activity, the detection platform may perform one or more actions, as described below. The one or more actions may reduce an impact of, or prevent, the malicious actor using the authentication information reset message(s) to change authentication information, and thereby access, the one or more accounts associated with the user.

Figure 1D:
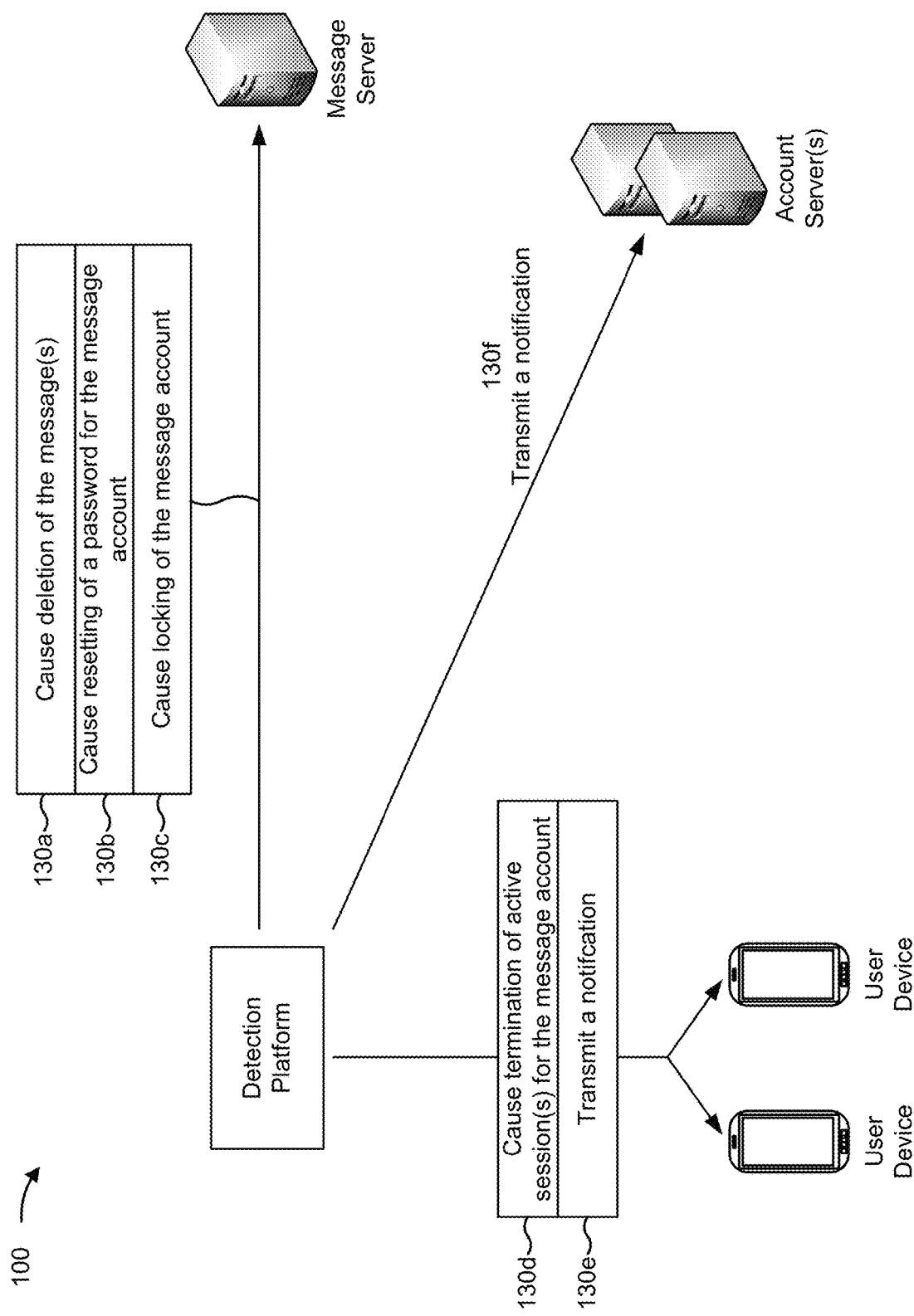

As shown in FIG. 1D, and by reference number 130a, based on determining that the one or more messages are indicative of abnormal authentication information resetting activity, the detection platform may cause deletion of the one or more messages. For example, the detection platform may cause deletion of the one or more messages from the message server. Moreover, the detection platform may cause deletion of one or more subsequent messages (e.g., arriving after the detection platform determines that the one or more messages are indicative of abnormal authentication information resetting activity) based on determining that the one or more messages are indicative of abnormal authentication information resetting activity. For example, the detection platform may cause deletion of authentication information reset messages for a particular time period, until the user performs an authentication task (e.g., answers a security question, uses a second authentication factor, provides biometric information, or the like), or the like. In some implementations, deletion of a message may also refer to preventing delivery of the messages to an inbox of the user (e.g., the messages may remain on the message server, but may be inaccessible to the message account of the user). In this way, the malicious actor may be unable to access the authentication information reset messages that are requested by the malicious actor.

In some implementations, rather than deleting the one or more messages, the detection platform may cause filtering of the one or more messages and redirection of the one or more messages to a monitoring location. The detection platform may perform additional monitoring of messages arriving to the monitoring location to determine whether the original determination that the one or more messages are indicative of abnormal authentication information resetting activity is correct. If the detection platform determines that the original determination is incorrect, the detection platform may cause the messages in the monitoring location to be released to the message account. Otherwise, if the detection platform determines that the original determination is correct, the detection platform may cause the messages in the monitoring location to be deleted. In some implementations, the detection platform may receive an input from a moderator of the monitoring location that indicates whether the original determination that the one or more messages are indicative of abnormal authentication information resetting activity is correct.

As shown by reference number 130b, based on determining that the one or more messages are indicative of abnormal authentication information resetting activity, the detection platform may cause resetting of authentication information (e.g., a password) for the message account. This may prevent delivery of additional messages to the message account until a successful authentication that uses the new authentication information. In some implementations, in order for the user to obtain the new authentication information, the detection platform may require the user to perform an authentication task.

As shown by reference number 130c, based on determining that the one or more messages are indicative of abnormal authentication information resetting activity, the detection platform may cause locking of the message account. For example, the detection platform may cause locking of the message account (thereby preventing all access to the message account) for a particular time period, until the user has performed an authentication task, or the like.

As shown by reference number 130*d*, based on determining that the one or more messages are indicative of abnormal authentication information resetting activity, the detection platform may cause termination of one or more active sessions for the message account. For example, one or more sessions for the message account may be active on one or more user devices (e.g., thereby allowing a malicious actor in possession of such a user device to access the message account). Thus, termination of the active sessions may prevent access to the message account.

As shown by reference number 130*e*, based on determining that the one or more messages are indicative of abnormal authentication information resetting activity, the detection platform may transmit a notification to one or more user devices. For example, the detection platform may transmit a notification to a device associated with the user and/or to a device associated with a contact of the user (e.g., a contact designated by the user for receiving notifications relating to abnormal authentication information resetting activity or other unusual message account activity). The notification may indicate the abnormal authentication information resetting activity.

As shown by reference number 130*f*, based on determining that the one or more messages are indicative of abnormal authentication information resetting activity, the detection platform may transmit a notification to one or more server devices. For example, the detection platform may transmit a notification to one or more devices of an entity that maintains an account of the user for which an authentication information reset message was received. The notification may indicate the abnormal authentication information resetting activity, may provide a recommendation that the account of the user be locked, may provide a recommendation that authentication information resetting be disabled for the account, may provide a recommendation that transactions for the account be blocked, may provide a recommendation that the account be monitored, or the like. In some implementations, the detection platform may determine an address for the entity (e.g., an email address) to which to transmit the notification based on processing (e.g., natural language processing) the authentication information reset message, using a database of addresses, or the like.

In some implementations, the detection platform may determine that the one or more messages, indicative of abnormal authentication information resetting activity, are for accounts of the user that are associated with a particular category. For example, the one or more messages may be associated with accounts that the user has with banks, accounts that the user has with government entities, or the like. Here, based on determining that the one or more messages are indicative of abnormal authentication information resetting activity, the detection platform may transmit a notification to one or more devices of an entity that does not maintain the one or more accounts associated with the authentication information reset messages (i.e., the entity did not transmit any of the authentication information reset messages that were received). For example, the entity may be associated with the particular category. As an example, if the one or more messages are associated with accounts that the user has with banks, the detection platform may transmit a notification to a credit bureau, to one or more other banks from which messages were not received (to proactively prevent a bank from sending an authentication information reset message to the message account of the user), or the like. The notification may indicate the abnormal authentication information resetting activity, may provide a recommendation that an account of the user associated with the entity be locked, may provide a recommendation that authentication information resetting be disabled for the account, may provide a recommendation that transactions for the account be blocked, may provide a recommendation that the account be monitored, or the like.

In some implementations, the detection platform, or another device (e.g., an account server), may perform monitoring of one or more accounts associated with the authentication information reset messages to determine whether activity associated with an account is indicative of abnormal account activity (e.g., excessive login attempts, a login attempt from an unrecognized device, an excessive quantity of transactions, a change to user information, or the like) and/or whether the activity satisfies one or more conditions (e.g., a quantity of login attempts satisfies a threshold, a quantity of transactions satisfies a threshold, or the like). In some implementations, the detection platform may receive an indication from the other device (e.g., that performed the monitoring) that the activity is indicative of abnormal account activity and/or satisfies one or more conditions. The detection platform may perform one or more actions described herein, with respect to the account or another account, based on the monitoring and/or the indication.

In some implementations, based on determining that the one or more messages are indicative of abnormal authentication information resetting activity, the detection platform may perform a combination of two or more of the actions described herein (e.g., described in connection with reference numbers 130*a* to 130*f*). In some aspects, the detection platform may select one or more actions to perform based on a risk level associated with the accounts associated with the authentication information reset messages (e.g., a bank account may be associated with a high risk, whereas an online gaming account may be associated with a low risk). For example, if an account is associated with a low risk, the detection platform may transmit a notification to a user device of the user, whereas if an account is associated with a high risk, the detection platform may cause locking of the message account. In some implementations, the detection platform may select one or more actions to perform based on a degree (e.g., "high," "moderate," or "low") of the abnormal authentication information resetting activity. For example, the model may output the degree of the abnormal authentication information resetting activity. As another example, the detection platform may determine the degree of the abnormal authentication information resetting activity based on the quantity of authentication information reset messages received, a length of a time window in which the messages arrived, an average time gap between arrivals of the messages, a sender of the messages, or the like.

In this way, the detection platform may prevent or mitigate unauthorized authentication information resetting and subsequent unauthorized account access, thereby conserving computing resources associated with the unauthorized account access, investigating the unauthorized account access, remediating the unauthorized account access, or the like. Moreover, the detection platform improves computer security, electronic account security, website security, or the like.

As indicated above, FIGS. 1A-1D are provided as an example. Other examples may differ from what is described with regard to FIGS. 1A-1D.

Figure 2:
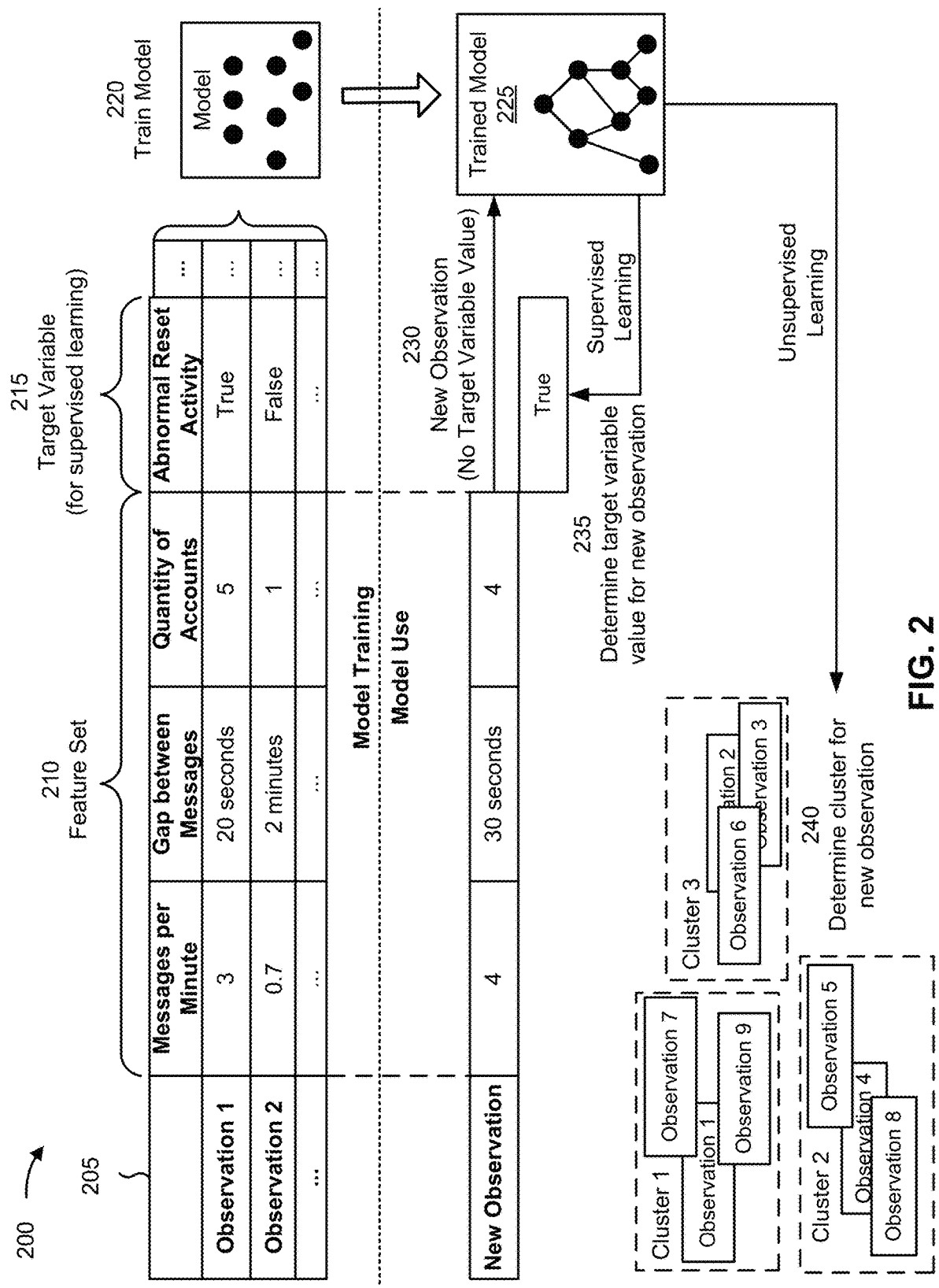
FIG. 2 is a diagram illustrating an example of training and using a machine learning model in connection with detecting malicious activity associated with resetting authentication information.

FIG. 2 is a diagram illustrating an example 200 of training and using a machine learning model in connection with detecting malicious activity associated with resetting authentication information. The machine learning model training and usage described herein may be performed using a machine learning system. The machine learning system may include or may be included in a computing device, a server, a cloud computing environment, or the like, such as the detection platform described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the detection platform and/or the message server, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the detection platform and/or the message server. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of messages per minute, a second feature of gap between messages, a third feature of quantity of accounts, and so on. As shown, for a first observation, the first feature may have a value of three, the second feature may have a value of 20 seconds, the third feature may have a value of five, and so on. These features and feature values are provided as examples, and may differ in other examples. For example, the feature set may include one or more of the following features: a quantity of the messages, times of arrival of the messages, an average time gap between arrivals of the messages, senders of the messages, accounts associated with the messages, and/or a quantity of accounts associated with the messages.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is abnormal reset activity, which has a value of true for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of four (message per minute), a second feature of 30 seconds (gap between messages), a third feature of four (accounts), and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of true for the target variable of abnormal reset activity for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first automated action may include, for example, causing deletion of messages, causing resetting of a password for a message account, causing locking of a message account, causing termination of active sessions of a message account, and/or transmitting a notification.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., abnormal), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detect malicious activity associated with resetting authentication information. The machine learning system enables recognition and/or identification of tens, hundreds, thousands, or millions of features and/or feature values for tens, hundreds, thousands, or millions of observations, thereby increasing accuracy and consistency and reducing delay associated with detecting malicious activity associated with resetting authentication information relative to requiring computing resources to be allocated for tens, hundreds, or thousands of operators to manually detect malicious activity associated with resetting authentication information using the features or feature values.

As indicated above, FIG. 2 is provided as an example. Other examples may differ from what is described in connection with FIG. 2.

Figure 3:
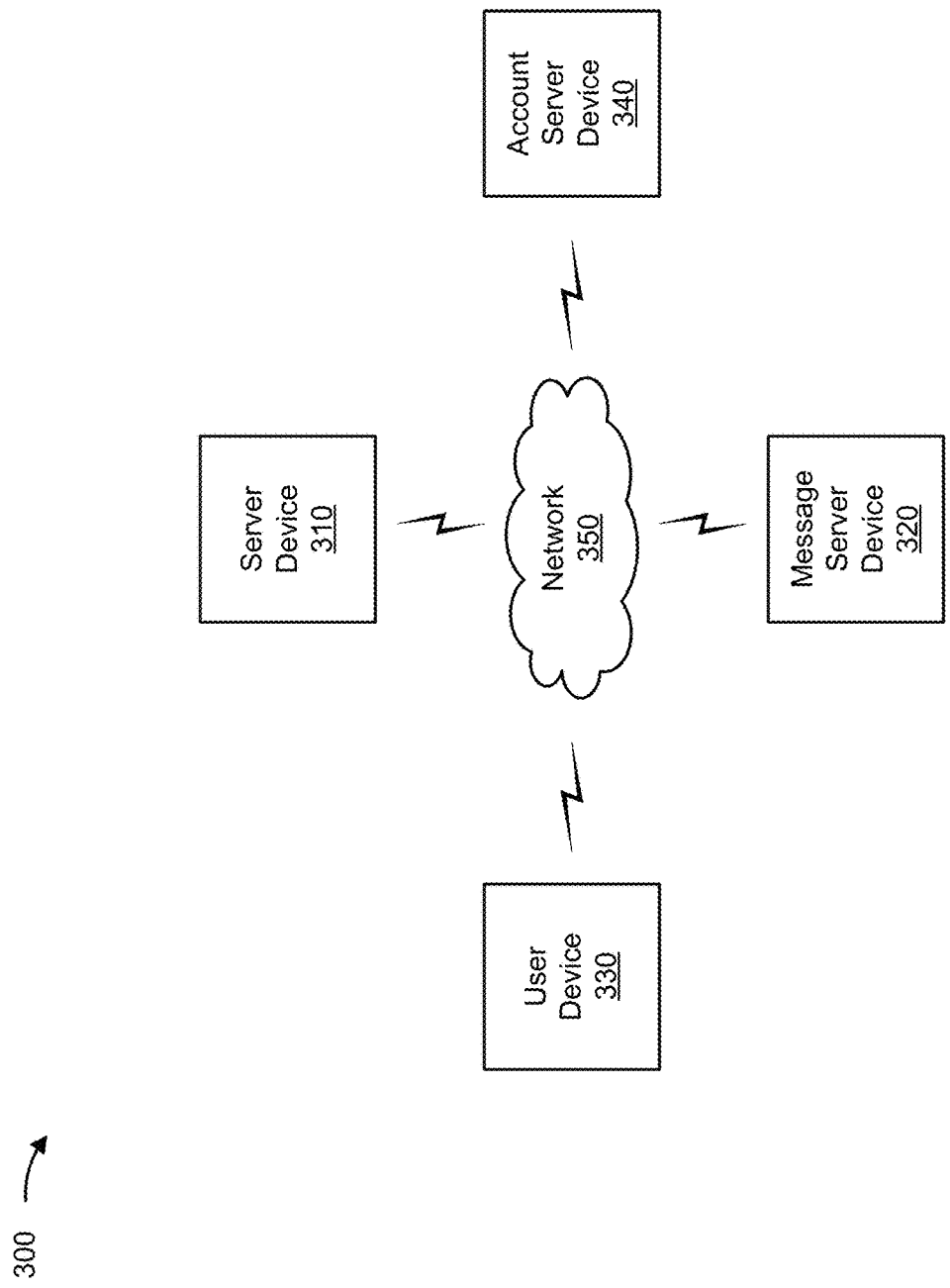
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a server device 310, a message server device 320, a user device 330, an account server device 340, and a network 350. Devices of environment 300 may interconnect via wired connections, wireless connections, or a combination of wired and wireless connections.

The server device 310 includes one or more devices capable of receiving, generating, storing, processing, providing, and/or routing information associated with determining abnormal authentication information resetting activity for a message account, as described elsewhere herein. For example, the server device 310 may implement the detection platform described herein. The server device 310 may include a communication device and/or a computing device. For example, the server device 310 may include a server, such as an application server, a client server, a web server, a host server, a virtual server (e.g., executing on computing hardware), or a server in a cloud computing system. In some implementations, the server device 310 includes computing hardware used in a cloud computing environment.

The message server device 320 includes one or more devices capable of receiving, generating, storing, processing, providing, and/or routing information associated with messages (e.g., email messages, text message, or the like) for a message account, as described elsewhere herein. The message server device 320 may include a communication device and/or a computing device. For example, the message server device 320 may include a server, such as an application server, a client server, a web server, a host server, a virtual server (e.g., executing on computing hardware), or a server in a cloud computing system. In some implementations, the message server device 320 includes computing hardware used in a cloud computing environment.

The user device 330 includes one or more devices capable of receiving, generating, storing, processing, and/or providing information associated with requests to reset authentication information for an account or notifications indicating abnormal password resetting activity, as described elsewhere herein. For example, the user device 330 may be associated with a malicious actor, a user associated with an account, or a contact of the user. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The account server device 340 includes one or more devices capable of receiving, generating, storing, processing, providing, and/or routing information associated with an account of a user, as described elsewhere herein. The account server device 340 may include a communication device and/or a computing device. For example, the account server device 340 may include a server, such as an application server, a client server, a web server, a database server, a host server, a proxy server, a virtual server (e.g., executing on computing hardware), or a server in a cloud computing system. In some implementations, the account server device 340 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
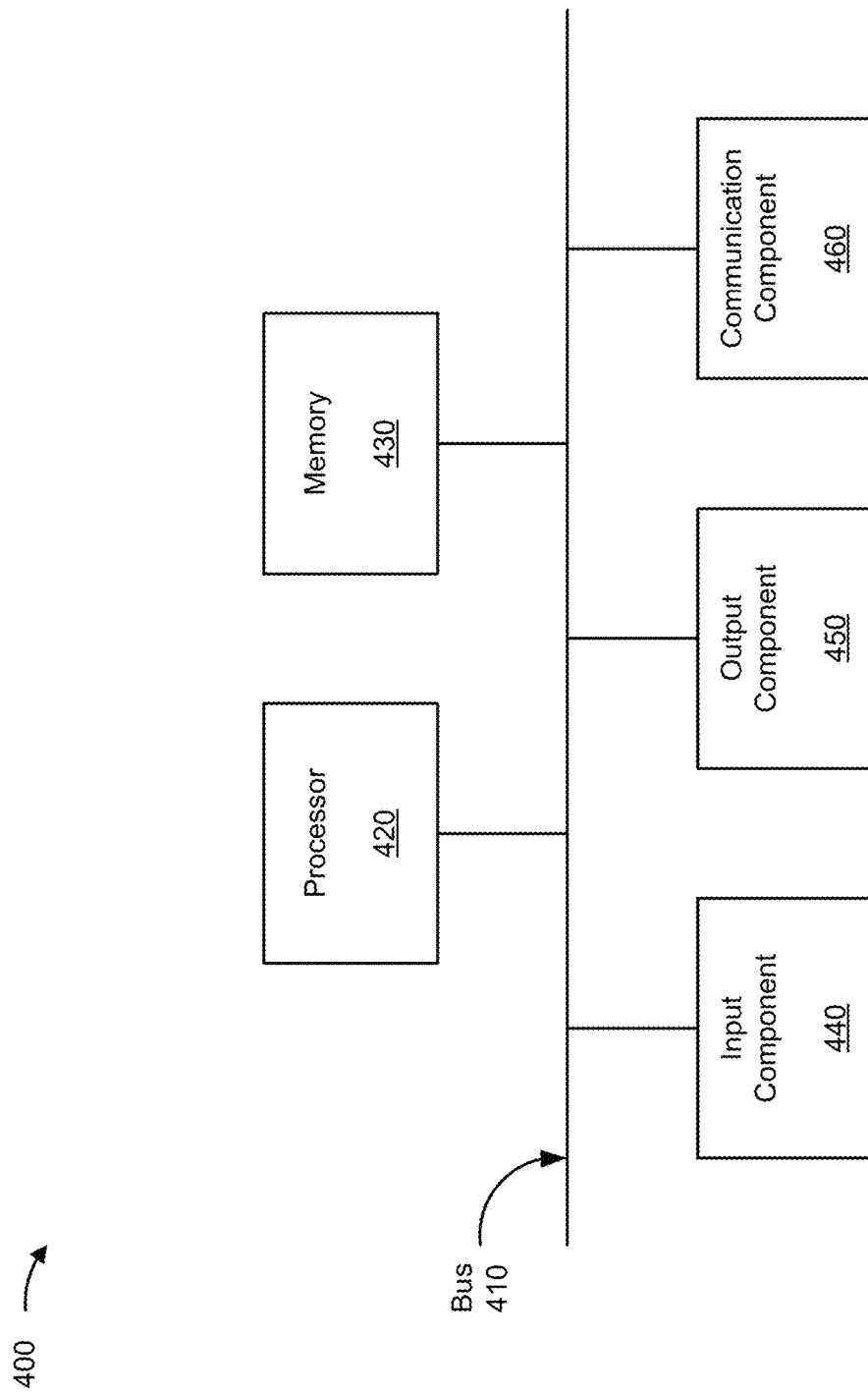
FIG. 4 is a diagram of example components of one or more devices of FIG. 3.

FIG. 4 is a diagram of example components of a device 400, which may correspond to the server device 310, the message server device 320, the user device 330, and/or the account server device 340. In some implementations, the server device 310, the message server device 320, the user device 330, and/or the account server device 340 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
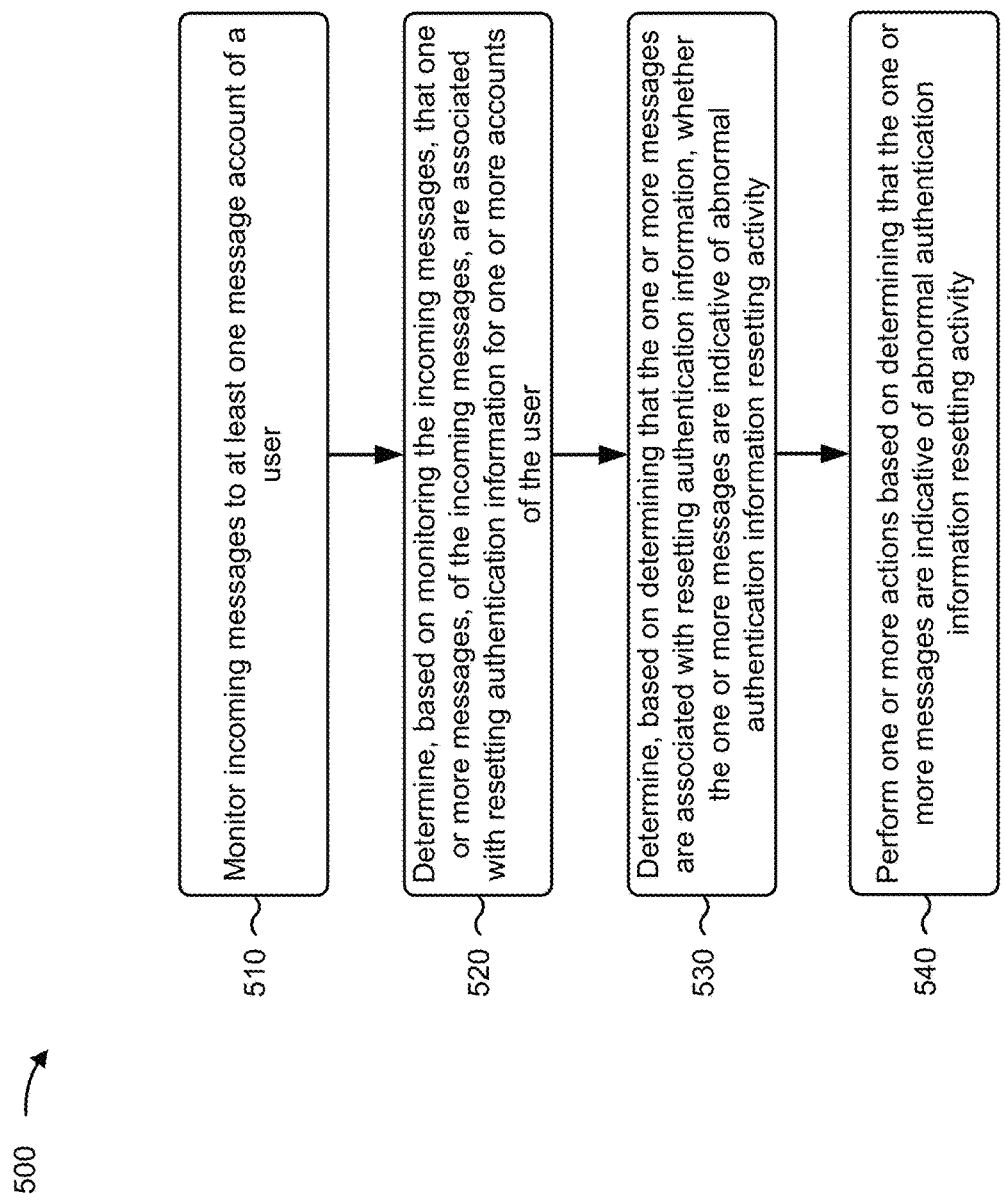
FIG. 5 is a flowchart of an example process relating to detecting malicious activity associated with resetting authentication information.

FIG. 5 is a flowchart of an example process 500 associated with detecting malicious activity associated with resetting authentication information. In some implementations, one or more process blocks of FIG. 5 may be performed by a device (e.g., server device 310). In some implementations, one or more process blocks of FIG. 5 may be performed by another device or a group of devices separate from or including the device, such as message server device 320, user device 330, and/or account server device 340. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include monitoring incoming messages to at least one message account of a user (block 510). As further shown in FIG. 5, process 500 may include determining, based on monitoring the incoming messages, that one or more messages, of the incoming messages, are associated with resetting authentication information for one or more accounts of the user (block 520). As further shown in FIG. 5, process 500 may include determining, based on determining that the one or more messages are associated with resetting authentication information, whether the one or more messages are indicative of abnormal authentication information resetting activity (block 530). As further shown in FIG. 5, process 500 may include performing one or more actions based on determining that the one or more messages are indicative of abnormal authentication information resetting activity (block 540).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for mitigating malicious activity associated with resetting passwords, the system comprising:
  one or more memories comprising instructions; and
  one or more hardware processors, coupled to the one or more memories, configured to:
    monitor incoming email messages to an email account of a user;
    determine, based on monitoring the incoming email messages, that a plurality of email messages, of the incoming email messages, each contains a message associated with resetting passwords for an additional account of the user different from the email account of the user,
      wherein the message includes at least one of:
        a link for resetting authentication information of the additional account,
        temporary authentication information of the additional account, or
        an instruction for resetting the authentication information of the additional account;
    determine, based on determining that the plurality of email messages each contains the message, that the plurality of email messages are indicative of abnormal password resetting activity; and
    cause deletion of the plurality of email messages based on determining that the plurality of email messages are indicative of abnormal password resetting activity.

2. The system of claim 1, wherein the plurality of email messages are determined to be indicative of abnormal password resetting activity based on one or more of:
  the plurality of email messages arriving within a threshold time period, or
  a quantity of the plurality of email messages satisfying a threshold value.

3. The system of claim 1, wherein the one or more hardware processors, to determine that the plurality of email messages are associated with resetting passwords, are configured to:
  process the plurality of email messages to identify whether the plurality of email messages include one or more keywords; and
  determine that the one or more email messages are associated with resetting passwords based on identifying that the plurality of email messages include the one or more keywords.

4. The system of claim 1, wherein the one or more hardware processors, to determine that the plurality of email messages are associated with resetting passwords, are configured to:
  perform natural language processing of the plurality of email messages to determine intent classifications for the plurality of email messages; and
  determine that the plurality of email messages are associated with resetting passwords based on the intent classifications.

5. The system of claim 1, wherein the plurality of email messages are determined to be indicative of abnormal password resetting activity using a model trained to output an indication of abnormal password resetting activity based on an input of information relating to the plurality of email messages.

6. The system of claim 5, wherein the model is trained based on historical data relating to the user or to a plurality of users.

7. The system of claim 1, wherein the one or more hardware processors are further configured to, based on determining that the plurality of email messages are indicative of abnormal password resetting activity, at least one of:
  cause termination of one or more active sessions for the email account of the user,
  cause resetting of a password for the email account of the user,
  cause locking of the email account of the user, or
  transmit a notification.

8. The system of claim 1, wherein the one or more hardware processors are further configured to:
  cause deletion of one or more subsequent email messages associated with resetting passwords based on determining that the plurality of email messages are indicative of abnormal password resetting activity.

9. A method of mitigating malicious activity associated with resetting authentication information, comprising:
  monitoring incoming messages to at least one message account of a user;
  determining, based on monitoring the incoming messages, that a plurality of messages, of the incoming messages, each contains a message associated with resetting authentication information of an additional account of the user different from the at least one message account of the user,
    wherein the message includes at least one of:
      a link for resetting authentication information of the additional account,
      temporary authentication information for the additional account, or
      an instruction for resetting the authentication information for the additional account;
  determining, based on determining that the plurality of messages each contains the message, that the plurality of messages are indicative of abnormal authentication information resetting activity; and
  performing one or more actions based on determining that the plurality of messages are indicative of abnormal authentication information resetting activity.

10. The method of claim 9, wherein the incoming messages include one or more of email messages, text messages, or electronic chat messages.

11. The method of claim 9, wherein the plurality of messages are determined to be indicative of abnormal authentication information resetting activity based on one or more of:
  the plurality of messages arriving within a threshold time period, or
  a quantity of the plurality of messages satisfying a threshold value.

12. The method of claim 9, wherein performing the one or more actions includes one or more of:
  causing deletion of the plurality of messages,
  causing termination of one or more active sessions for the message account of the user,
  causing resetting of authentication information for the message account of the user,
  causing locking of the message account of the user, or
  transmitting a notification.

13. The method of claim 9, wherein the plurality of messages are determined to be associated with resetting authentication information based on one or more of:
- contents of the plurality of messages, or
- senders of the plurality of messages.

14. The method of claim 9, wherein the plurality of messages are determined to be indicative of abnormal authentication information resetting activity using a model trained to output an indication of abnormal authentication information resetting activity based on an input of information relating to the one or more messages.

15. A non-transitory computer-readable medium storing a set of instructions for mitigating malicious activity associated with resetting authentication information, the set of instructions comprising:
- one or more instructions that, when executed by one or more processors of a device, cause the device to:
  - monitor incoming messages to a message account of a user;
  - determine, based on monitoring the incoming messages, that a plurality of email messages, of the incoming messages, each contains a message associated with resetting passwords for an additional account of the user different from the message account of the user,
    - wherein the message includes at least one of:
      - a link for resetting authentication information of the additional account,
      - temporary authentication information of the additional account, or
      - an instruction for resetting the authentication information of the additional account;
  - determine, based on determining that the plurality of email messages each contains the message, that a plurality of messages, of the incoming messages, are indicative of abnormal authentication information resetting activity for additional accounts of the user different from the message account of the user; and
  - perform one or more actions based on determining that the plurality of messages are indicative of abnormal authentication information resetting activity.

16. The non-transitory computer-readable medium of claim 15, wherein the plurality of messages are determined to be indicative of abnormal authentication information resetting activity based on one or more of:
- the plurality of messages arriving within a threshold time period, or
- a quantity of the plurality of messages satisfying a threshold value.

17. The non-transitory computer-readable medium of claim 15, wherein the one or more instructions, that cause the device to perform the one or more actions, cause the device to one or more of:
- cause deletion of the plurality of messages, or
- cause deletion of one or more subsequent messages arriving during a threshold time period.

18. The non-transitory computer-readable medium of claim 15, wherein the one or more instructions, that cause the device to perform the one or more actions, cause the device to one or more of:
- cause termination of one or more active sessions for the message account of the user,
- cause resetting of authentication information for the message account of the user, or
- cause locking of the message account of the user.

19. The non-transitory computer-readable medium of claim 15, wherein the one or more instructions, that cause the device to perform the one or more actions, cause the device to one or more of:
- transmit a notification to a device of the user or a contact of the user, or
- transmit a notification to one or more devices of an entity that maintains the additional account of the user.

20. The non-transitory computer-readable medium of claim 15, wherein the one or more messages are determined to be indicative of abnormal authentication information resetting activity using a model trained to output an indication of abnormal authentication information resetting activity based on an input of information relating to the plurality of messages.

* * * * *